United States Patent [19]

Lorenz et al.

[11] Patent Number: 4,493,009
[45] Date of Patent: Jan. 8, 1985

[54] COMPRESSED GAS INSULATED HIGH VOLTAGE SWITCHING INSTALLATION WITH SINGLE PHASE METALLIC ENCAPSULATION

[75] Inventors: Dieter Lorenz; Willi Olsen, both of Berlin, Fed. Rep. of Germany

[73] Assignee: Siemens Aktiengesellschaft, Munich, Fed. Rep. of Germany

[21] Appl. No.: 488,275

[22] Filed: Apr. 25, 1983

[30] Foreign Application Priority Data

May 4, 1982 [DE] Fed. Rep. of Germany ....... 3217186

[51] Int. Cl.³ ............................................. H02B 1/04
[52] U.S. Cl. .................................. 361/341; 361/333; 200/48 R
[58] Field of Search ............... 361/332, 333, 335, 341, 361/376, 378, 429; 200/50 AA, 48 R

[56] References Cited

U.S. PATENT DOCUMENTS 4,237,520 12/1980 Oishi et al. ............... 361/341
4,241,379 12/1980 Olsen ....................... 361/341
4,354,220 10/1982 Oishi ....................... 361/341

OTHER PUBLICATIONS

Elektrie, "Montage der kompletten GSAS-Schaltanlage und erste Betriebserfahrungen", Weekend and Berlin, 1977, pp. 316-321.

Principal Products, "Metal-Clad Switchgear for High Voltage", (Prospekt der Firma COQ C-P-76-2E.

Primary Examiner—G. P. Tolin
Attorney, Agent, or Firm—Kenyon & Kenyon

[57] ABSTRACT

In a compressed gas insulated high voltage switching installation, in particular, one with single phase metallic encapsulation, including bus bar systems and switchgear sections, with branches which are firmly anchored in space and in which compensators with tie rods are arranged in line with the bus bar systems, the longitudinal expansion of the housings of the bus bar systems is taken up practically free of stress without large cost, by subdividing each phase of the bus bar systems into sections preferably lying along two parallel longitudinal axes. Double-T-shaped connecting housings, firmly anchored in space, are arranged between adjacent sections of the same phase and, at least at one end of each section, a compensator is arranged on both sides of the connecting housing. Tie rods, starting from the outer flanges of the compensators, bridge the compensators and the connecting housing.

11 Claims, 16 Drawing Figures

COMPRESSED GAS INSULATED HIGH VOLTAGE SWITCHING INSTALLATION WITH SINGLE PHASE METALLIC ENCAPSULATION

BACKGROUND OF THE INVENTION

This invention relates to compressed gas insulated high voltage switching installations in general and, in particular, to such an installation with a single phase metallic encapsulation.

A high voltage switching installation of this general type which includes bus bar systems and switch gear sections, at least one of which is firmly anchored in space, and in which compensators with tie rods are arranged in line with the bus bar systems is described in the journal "Elektrie" 1977, pages 316 to 321 and in particular page 317.

In such compressed gas insulated high voltage switching installation which sometimes can have a large lengthwise dimension, considerable problems arise with respect to the thermal expansion of the housings of the bus bar systems. In order to avoid mechanical stresses in the housings, certain points of the high voltage switching installation are firmly anchored in space and therefore form a fixed point. In the known high voltage switching installation, this fixed point is in the center of a switch gear section which is located at approximately the center of the installation. The parts connected to the fixed point via the housings of the bus bar systems are supported on the foundation so that they can slide and can move as a whole in the event of length changes of the housings due to temperature changes. While additional stresses of the housings forming the encapsulation which occur with unfavorable leverage as referred to the sliding points of the section, are produced in the switchgear sections, compensators with tie rods are also arranged in the train of the bus bar housings. Since the tie rods always bridge the compensator, the compensator can only equalize the dimensional deviations caused by tolerances between the individual switchgear sections.

It is further known (brochure of the firm COQ, C-P-76-E) to build the compensators into the housings of the bus bar in such a way that they take up longitudinal expansion. In view of the gas pressure in the encapsulation tube, the tie rods are arranged in this case between fixed points of the installation in such a manner that they bridge the compensators. However, in this cse, care must be taken that the tie rids are designed out only for the operational gas pressure but, so as to account for the case of a fault arc with a pressure increase to three times the value, for this increased gas pressure. A further problem arises for long tie rods in compressed gas insulated installations if the gas chambers are evacuated in connection with installation or maintenance work, causing a buckling stress to act on the compensator. In addition, the tie rods's own elongation leads to additional loads on the fixed points.

Particularly in hydroelectric power stations with turbine and switching section spacings on the order of 40 to 50 m and bus bar lengths of several hundred meters, the known compensator/tie rod arrangements are applicable only with additional, high cost technical measures. It is an object of the present invention to take up the longitudinal expansion of the housings of the bus bar system, without great cost, through a special mechanical design of such compressed gas insulated encapsulated high voltage switching installations in such a manner that no appreciable mechanical stresses occur in the installation.

SUMMARY OF THE INVENTION

According to the present invention, a compressed gas insulated high voltage switching installation of the type described at the outset is designed, for solving this problem, in such a manner that in an installation in which all branches of the switch gear sections are firmly anchored in space, every phase of the bus bar system is subdivided into sections with, preferably two, parallel longitudinal axes, in such a manner that at least two successive sections with different longitudinal axes are located between three successive branches, that between adjacent sections of the same phase, double T-shaped connecting housings are anchored firmly in space; and that, for each section of the bus bar, at least at one of the two connecting housings located at the ends, a compensator is arranged at each of two connecting flanges of this connecting housing lying along the longitudinal axis of the section; and tie rods which, starting from the outer flanges of the compensators, bridge the latter and the connecting housing are provided.

In compressed gas insulated high voltage switching installations designed in accordance with the present invention, the bus bar phases therefore no longer extend in successive housings with a single longitudinal axis, but every phase of the bus bar system is subdivided into shorter sections which preferably have two parallel longitudinal axes and are connected to each other by double T-shaped connecting housings which form respective fixed points. Since compensators are also arranged at least at one end of each section on both sides of the part of the connecting housing located along the longitudinal axis, they always compensate the length changes occuring in the sections. The compensators need to be designed only for relatively small length changes of a section. For sections of equal length, the compensators can therefore have the same length. The load on all fixed points is the same and is only on the order of magnitude of the force resulting from the spring constants of the compensators. Also the tie rods which start from the outer flanges of the compensators and bridge the former and the connecting housing, are short and their length is independent of the longitudinal expansion of the bus bar system and the number of fixed section points. In addition, the tie rods' own expansion is also taken up by the compensators.

This subdivision of the bus bar housing into sections with parallel longitudinal axes, however, requires practically no additional space, so that the total cost for the installation, among other things, as to area and buildings or foundations is kept low.

It is advantageous that the length of the sections of the bus bar system always corresponds to the distance between adjacent branches of the same phase of the switchgear section. Since the branches of the switching sections as well as the connecting housings between the sections are firmly anchored in space, the housings for the branches can therefore be fastened to the connecting housings in a very simple way. Depending on the geometric arrangement of the equipment contained in the individual switching sections, the connecting flanges for the housings of the branches can be arranged either in the part of the connecting housing located along the longitudinal axis of the bus bar or at the cross piece, the axis of which extends in the plane of the longitudinal bus bar axes at right angles to the bus bar.

It is advisable to connect the connecting housing via a respective pressure proof and arc proof bulkhead feedthrough to the section of the bus bar system. In addition, the connecting housing may advantageously also be provided with a pressure proof and arc proof bulkhead feedthrough in the cross piece. By doing this, in the event of a fault arc, only one outgoing bus bar setion is involved at this node, while in the branches customary heretofore, with at most two feedthroughs, both bus sections had to be repaired.

For controlling very large elongations, compensators can also be built in on both sides adjacent to the connecting housing. In order to obtain a uniform distribution of the elongation to be taken up over these compensators, which may have different spring constants, it is advisable to anchor the center of the section firmly in space. However, it is also possible to provide a stop for limiting the motion of the compensators at one of the two connecting housings.

DETAILED DESCRIPTION

Figure 1:
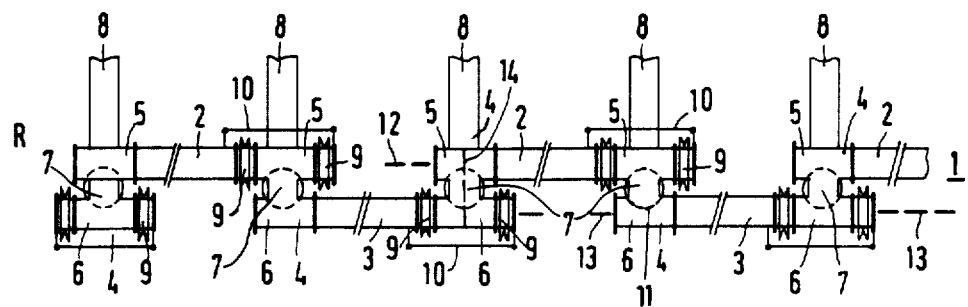
FIGS. 1 and 3 to 6 are schematic views of a phase of a bus bar system and the connecting housings according to the present invention.

FIG. 1 shows phase R of a bus bar system 1 of an encapsulated, compressed gas insulated high voltage switching installation which is composed of sections 2 and 3 of housings for the bus bars lying respectively along two parallel longitudinal axes. At the ends of these sections 2 and 3, respectively, double T-shaped connecting housings 4 connect the sections 2 and 3 of housings lying along the two parallel longitudinal axes to each other. Each connecting housing 4 comprises a part 5 which is aligned with the longitudinal axis of section 2, and a part 6 which is arranged parallel thereto and has its longitudinal axis aligned to that of section 3. These parts 5 and 6 are connected by a cross piece 7, the axis of which lies in the plane of the longitudinal bus bar axes and extends at right angles to the bus bars. The housings of the branches 8 of the switchgear sections which are broken off short and are only indicated are connected to the center of cross piece 7.

In the sections 2 a compensator 9 is arranged at one end at the connecting flanges between the part 5 of the connecting housing 4 and section 2. Another compensator 9 is disposed at the outer flange of part 5. These compensators 9 and part 5 of the connecting housing 4 are bridged by tie rods 10 which start from the outer flanges of the respective compensators 9. Compensators 9 are also arranged at one end of each section 3 laterally to the parts 6 of the connecting housing 4, and are likewise bridged by tie rods 10. These compensators 9 can take up the longitudinal expansions of the sections 2 and 3 due to temperature changes. Since two compensators 9 are associated with each section 2 and 3, and the sections 2 and 3 are of the same length, the compensators 9 can be made identical. The length of the tie rods 10 is small. In this manner it is immaterial how great the total length of the phase R of the bus bar system 1 is, since only the longitudinal expansion of one section 2 or 3 need to be taken up by the compensators 9. Thus, their stress as well as that of the tie rods 10 are correspondingly small. Since the connecting housings 4 are firmly anchored in space and thereby form fixed points, the load on all fixed points is furthermore equal and is only on the order of magnitude of the forces resulting from the spring constants of the compensators 9.

Figure 2:
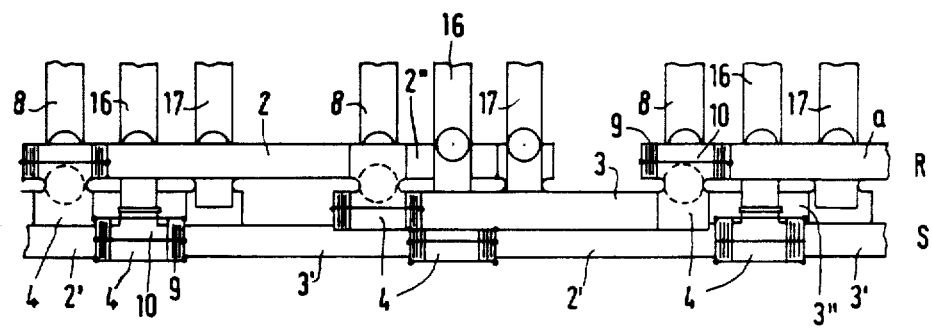
FIG. 2 is a side view of the three phases in a three phase system according to the present invention.
Figure 7:
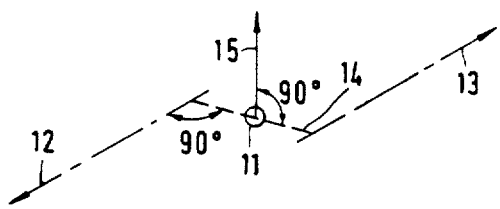
FIGS. 7, 9, 11, 13 and 15 schematically illustrate different possibilities of connecting the branches of the switchgear sections.
Figure 8:
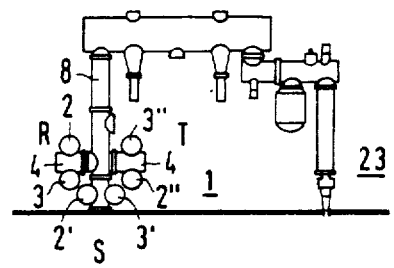
FIGS. 8, 10, 12, 14 and 16 are views of the arrangements of FIGS. 7, 9, 11, 13 and 15 showing the different positions of the bus bar sections.

In the centered position of the branching point 11 of the housings of the branches 8 forming the same phases of the switchgear sections, shown in FIG. 1, the relationship of the longitudinal axis 12 of the section 2 and the longitudinal axis 13 of the section 3 of the bus bar system 1 to the axis 14 of the cross piece 7 of the connecting housing 4 and to the axis 15 of the branch 8 is obtained, as better shown in FIG. 7. From this an arrangement of the sections 2, 2', 2" and 3, 3', 3" of the individual phases R, S, T relative to each other, as is shown in FIG. 8 and FIG. 2 results. The branches of the phase S of the switchgear sections are designated as 16, and those of phase T as 17.

Figure 3:
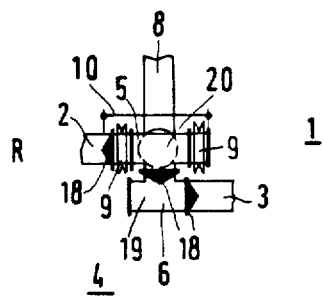

FIG. 3 shows a connecting housing 4 between the sections 2 and 3 of the phase R of the bus bar system 1 of an encapsulated, compressed gas insulated high voltage switching installation. On both sides of the part 5 of the connecting housing 4, in line with the longitudinal axis of section 2, compensators 9, which are bridged by tie rods 10, are disposed. In addition, the connecting flange to section 2 is designed as a pressure proof and arc proof bulkhead feedthrough 18, as is the connecting flange between section 3 and part 6 of the connecting housing 4. A further pressure proof and arc proof bulkhead feedthrough is arranged in the cross piece 7. Thereby two bulkhead chambers 19 and 20 are created in the connecting housing 4 so that, in case of a fault arc in the connecting housing 4, only one outgoing bus bar section 2 or 3 is involved and suitable repairs can be made without having to perform repair work on the second bus bar section.

Figure 4:
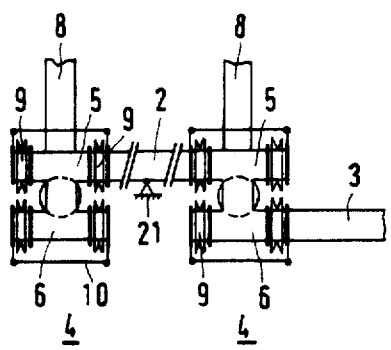
Figure 5:
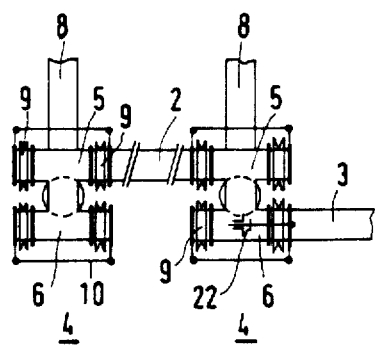

In FIGS. 4 and 5, respectively, a bus bar system 1 is shown in which the lengths of the individual sections 2 and 3 which are situated between two brances 8 of the switchgear sections, are relatively long, as is indicated by the double break. In this case, for taking up the longitudinal expansion, it is advantageous if compensators 9, which are bridged by tie rods 10, are arranged at both ends of the section on both sides of the parts 5 and 6 of the connecting housings 4. Since, however, due to manufacturing tolerances, even the spring constants of compensators 9 of the same dimensions may turn out differently, not only are the connecting housings 4 each firmly anchored in space in the embodiment according to FIG. 4, but a further fixed point 21 is provided in the center of each of the sections 2 and 3. In the embodiment according to FIG. 5, there is provided, instead of such a fixed point 21, a limiting stop 22 for limiting the motion of the compensators 9 in one of the two connecting housings 4; this stop limits the expansion of the compensators 9 to the permissible magnitude.

Figure 6:
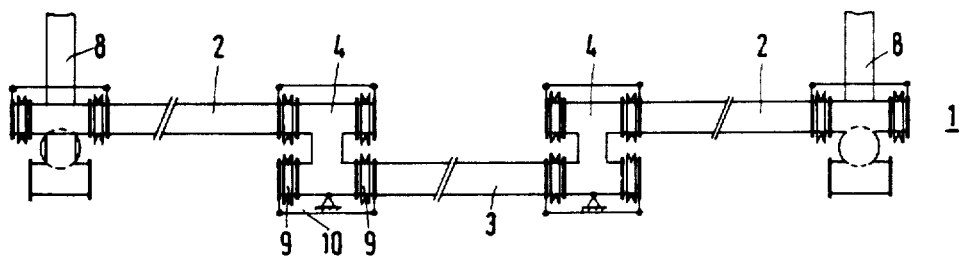

However, it is also possible for the spacing between two branches 8 of the same phase of the switchgear sections in a bus bar system 1 with the customary temperature differences to become so great that the length changes can no longer be taken up by four compensators 9 alone. Such an embodiment is shown in FIG. 6.

There, the lengths of the sections 2 and 3 of the bus bar system 1 located between the two adjacent branches 8 are chosen so that several, in this case three, sections 2 and 3 are provided between the two branches 8. These are also connected to each other by connecting housings 4 with laterally arranged compensators 9 which are bridged by tie rods 10. The connecting housings 4 which are not connected to a branch 8 are also firmly anchored in space and thereby also form fixed points in line with the bus bar system 1 between the branches 8 which are likewise firmly anchored in space, as are the connecting housings 4 connected to them. Therefore, the lengths of the individual sections 2 and 3 of the bus bar system 1 with parallel longitudinal axes can be chosen, depending on the desired size of the compensators 9 to be used, in such a manner that all possible longitudinal expansions can be taken up, regardless of the spacing between adjacent branches 8.

The various different locations of the branching points 11 of switchgear sections relative to the longitudinal axes 12 and 13 of the sections 2, 2', 2'' and 3, 3' 3'' of the three phases are R, S, T of a bus bar system 1 are shown schematically and by views of different switchgear sections in FIGS. 7 to 16. These embodiments show clearly that by subdividing the phases R, S, T of the bus bar system 1 into sections 2 and 3 with different, parallel longitudinal axes 12 and 13 of the housings, hardly a larger space for the high voltage switching installation is required, but that rather all bus bar sections 2 and 3 can be accommodated in the space enclosed by the switchgear section.

Thus, a cable terminating section 23 is shown in FIG. 8, with a single bus bar system 1, which is subdivided into two sections 2 and 3. The housings of the branches 8 are flanged, centered, to the cross piece of the connecting housing 4 as shown in FIG. 7.

Figure 9:
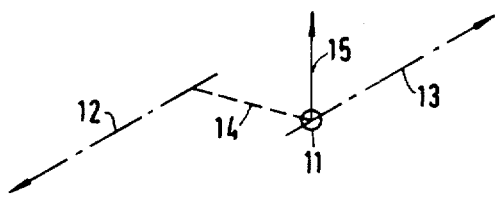
Figure 10:
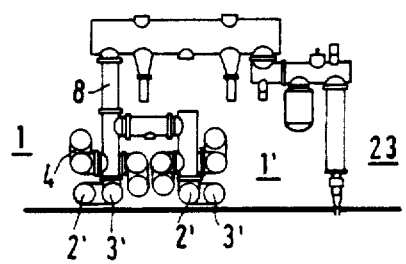

If, on the other hand, the branch 8 of the same cable terminating section 23 is flanged, as shown in FIGS. 9 and 10, to a part of the connecting housing 4 which is disposed along the longitudinal axis 13 of the section 3, then even two parallel bus bar sustems 1 and 1' can be accommodated in the same space.

Figure 12:
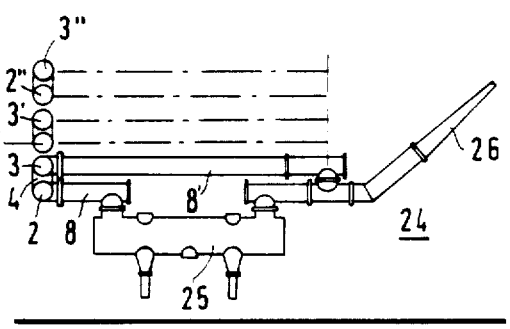
Figure 14:
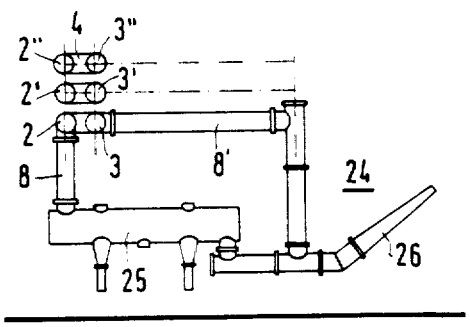
Figure 15:
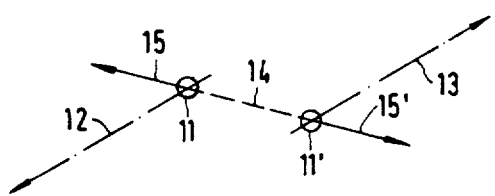
Figure 16:
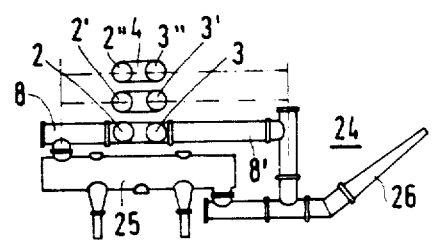

FIGS. 12, 14 and 16 each shown an overhead line terminating section 24, in which the one section 2, 2' or 2'' of the bus bar system is connected, via the branching point 11, with the branch 8, the housing of which is flanged to the part of the connecting housing 4 disposed along the longitudinal axis 12, to a circuit breaker 25. A further branch 8' is flanged to the part of the section 3, 3' or 3'' disposed along the longitudinal axis 13 and forms connecting elements (bypass) to the overhead line termination 26.

Figure 11:
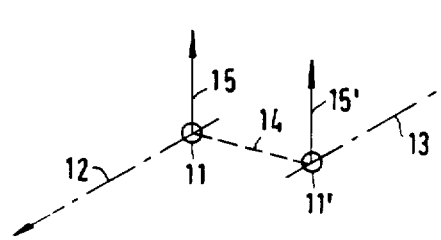
Figure 13:
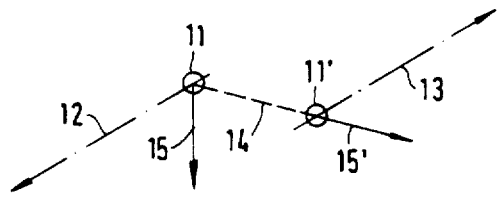

The branch axes 15 or 15' can extend in different directions in these switchgear sections 24, whereby different arrangements are obtained for the mutual position of the sections 2 and 3 of the phases R, S, T of the bus bar system 1. Thus, FIGS. 11 and 12 show branch axes 15 and 15' of the branches 8, and 8' which are parallel to each other and are perpendicular to the plane of the longitudinal axes 12 and 13 of the sections 2 and 3. In FIGS. 13 and 14, only the branch axis 15 is perpendicular to the plane of the longitudinal section axes 12 and 13, and the branch axis 15' is in the extension of the axis 14 of the cross piece of the connecting housing 4. In the embodiments according to FIGS. 15 and 16, both branch axes 15 and 15' are in the extension of the axis 14 of the cross piece of the connecting housing 4.

What is claimed is:

1. In a compressed gas insulated high voltage switching installation with a metallic encapsulation, including bus bar systems and switchgear sections at least one of which is firmly anchored in space and in which compensators with tie rods are arranged in line with the bus bar systems, the improvement comprising:
   (a) all branches of the switchgear sections in the installation firmly anchored in space;
   (b) each phase of the bus bar systems being subdivided into sections alternately lying along two parallel longitudinal axes in such a manner that between three respective successive branches at least two successive sections having different longitudinal axis are disposed;
   (c) double T-shaped connecting housings, having parts aligned with said two axes and a cross piece connecting said parts with inner and outer connecting flanges at the ends of the parts aligned with said axes, disposed between and coupled to adjacent sections of the same phase, said double T-shaped housings firmly anchore in space;
   (d) a compensator for each section of the bus bar, arranged at the ends said inner and outer connecting flanges at one of the two connecting housings disposed at opposite ends of said section; and
   (e) tie rods extending from the outer flange of each compensator to its inner flange bridging said compensators and said connecting housing part.

2. The improvement according to claim 1, wherein the length of the sections of the bus bar system corresponds to the respective distance between adjacent branches of the same phases of the switchgear sections.

3. The improvement according to claim 2, wherein the connecting flanges for the housings of the branches are arranged at the part of the connecting housing which is disposed along the longitudinal axis of the bus bar.

4. The improvement according to claim 1, wherein the connecting flanges for the housings of the branches are arranged at the part of the connecting housing which is disposed along the longitudinal axis of the bus bar.

5. The improvement according to claim 1, wherein each connecting housing is formed by a housing combination.

6. The improvement according to claim 5, wherein each connecting housing is connected to the section of the bus bar system via respective pressure proof and arc proof bulkhead feedthroughs.

7. The improvement according to claim 6, wherein the connecting housing also has a pressure proof and arc proof bulkhead feedthrough in the cross piece.

8. The improvement according to claim 1, wherein each connecting housing is connected to the section of the bus bar system via respective pressure proof and arc proof bulkhead feedthroughs.

9. The improvement according to claim 1, wherein each connecting housing has a pressure proof and arc proof bulkhead feedthrough in the cross piece.

10. The improvement according to claim 1, wherein compensators are installed at the connecting housings at each end of a section and wherein the center of said section is firmly anchored in space.

11. The improvement according to claim 1, wherein compensators are provided on both sides of a section at the connecting housings and further includes a limiting stop for the motion of the compensators.

* * * * *